United States Patent [19]

Fukuda et al.

[11] Patent Number: 5,749,720
[45] Date of Patent: May 12, 1998

[54] GAS HEATING APPARATUS WITH DUAL BURNERS

[75] Inventors: Seiji Fukuda; Sunao Nakamura; Yotaro Ohno, all of Kawasaki-ku, Japan

[73] Assignee: NKK Corporation, Tokyo, Japan

[21] Appl. No.: 544,116

[22] Filed: Oct. 17, 1995

[30] Foreign Application Priority Data

Apr. 21, 1995 [JP] Japan ................... 7-096857

[51] Int. Cl.⁶ ............................ F23D 23/00; F23D 14/12
[52] U.S. Cl. .................... 431/285; 431/353; 431/183; 431/328; 431/278; 431/264; 126/91 A
[58] Field of Search ............... 126/91 A, 110 C, 126/110 B; 431/170, 158, 350, 353, 264, 354, 183, 7, 326, 328, 284, 285, 278

[56] References Cited

U.S. PATENT DOCUMENTS

| | | | |
|---|---|---|---|
| 2,918,118 | 12/1959 | Schirmer | 431/285 |
| 2,957,753 | 10/1960 | Nelson et al. | 431/328 |
| 3,733,164 | 5/1973 | Westlake et al. | 431/328 |
| 3,840,344 | 10/1974 | Garbo | |
| 5,205,731 | 4/1993 | Reuther et al. | 431/328 |
| 5,211,552 | 5/1993 | Krill et al. | |
| 5,511,970 | 4/1996 | Irwin et al. | 431/284 |
| 5,603,905 | 2/1997 | Bartz et al. | 431/7 |

FOREIGN PATENT DOCUMENTS

| | | | |
|---|---|---|---|
| 4-122922 | 11/1992 | Japan . | |
| 1463663 | 2/1977 | United Kingdom | 431/328 |

*Primary Examiner*—Carl D. Price
*Attorney, Agent, or Firm*—Frishauf, Holtz, Goodman, Langer & Chick

[57] ABSTRACT

A gas heating apparatus has a cylindrical outer shell disposed along a duct in which a gas to be heated flows. A pre-mixture gas supply tube is connected to the outer shell. A combustion unit including a sintered fiber mat is provided inside the outer shell with a spacing being provided between outer shell and the sintered fiber mat. The combustion unit burns the pre-mixture gas on an inner surface of the sintered fiber mat. A diffusion burner is preferably provided upstream of the outer shell and of the combustion unit to increase the heating effect. With these constructions, it is possible to obtain a smaller-sized heating apparatus which produces a higher output.

12 Claims, 5 Drawing Sheets

GAS HEATING APPARATUS WITH DUAL BURNERS

BACKGROUND OF THE INVENTION

1. Field of the Invention

The present invention relates to an apparatus for heating a gas flowing in piping or a duct by use of a gas as a fuel.

2. Description of the Related Art

A conventional heating apparatus of this type, for example, an auxiliary burner apparatus, is disclosed in Japanese Utility Model Unexamined Publication No. 4-122922.

More specifically, as shown in FIG. 7, a prior art apparatus comprises a flame-stabilizing member 40 which is diverged in a downstream direction, and which is connected to a header provided with a fuel nozzle. The apparatus is disposed within an exhaust gas flow passage. With this construction, the apparatus heats an exhaust gas flowing in through holes 41 provided in the flame-stabilizing member 40 by use of a fuel discharged from the fuel nozzle.

In the prior art heating apparatus constructed as described above, a flame generated at an outlet of the fuel nozzle has a length in proportion to the amount of gas charged into the header. Accordingly, particularly when the apparatus produces a greater burner output, a longer flame is generated. Further, a space is required for mixing fuel and air in a diffusion type gas burner. Because of these factors, it is further necessary to provide piping or a duct having a cross-sectional area much greater than that required for merely allowing a gas to be heated to flow, which makes it difficult to enhance the downsizing of the heating apparatus while also producing a higher output.

SUMMARY OF THE INVENTION

Accordingly, the object of the present invention is to provide an apparatus for heating a gas flowing in a piping or a duct by use of a gas as a fuel, which apparatus enables a higher output to be achieved, and which also enables downsizing of the apparatus.

In order to attain the above object, the present invention provides a gas heating apparatus comprising an outer shell disposed along a piping or a duct, and into which a gas to be heated is supplied; a pre-mixture gas supply tube connected to the outer shell for supplying a pre-mixture gas to the interior of the outer shell; and a sintered fiber mat disposed inside the outer shell across a spacing, opposite ends of the sintered fiber mat being secured to the outer shell by protrusions located at both opposite ends of the outer shell, and an inner surface of the sintered fiber mat comprising a combustion surface for combusting the supplied pre-mixture gas.

The above-described apparatus may further comprise a blow-screening member for preventing the flow of the gas to be heated from directly striking the combustion surface of the sintered fiber mat, the blow-screening member being disposed inside a cylindrical member of the outer shell adjacent to an upstream end of the outer shell from which the gas to be heated flows.

The above-described apparatus may further comprise a flow reducing member for decreasing a cross-sectional area of the gas passing through the reducing member, the reducing member being disposed inside the cylindrical member of the outer shell adjacent to a downstream end of the heating apparatus from which the gas to be heated flows out to exterior of the heating apparatus after being heated.

According to a further important feature of the invention, the apparatus further comprises a diffusion burner provided upstream of the outer shell for further heating the gas to be heated. The diffusion burner is provided upstream of the cylindrical sintered fiber mat, in the flow path of the gas to be heated. By providing both the sintered fiber mat and the diffusion burner, improved heating effects and improved downsizing of the apparatus can be achieved.

DETAILED DESCRIPTION

Figure 1:
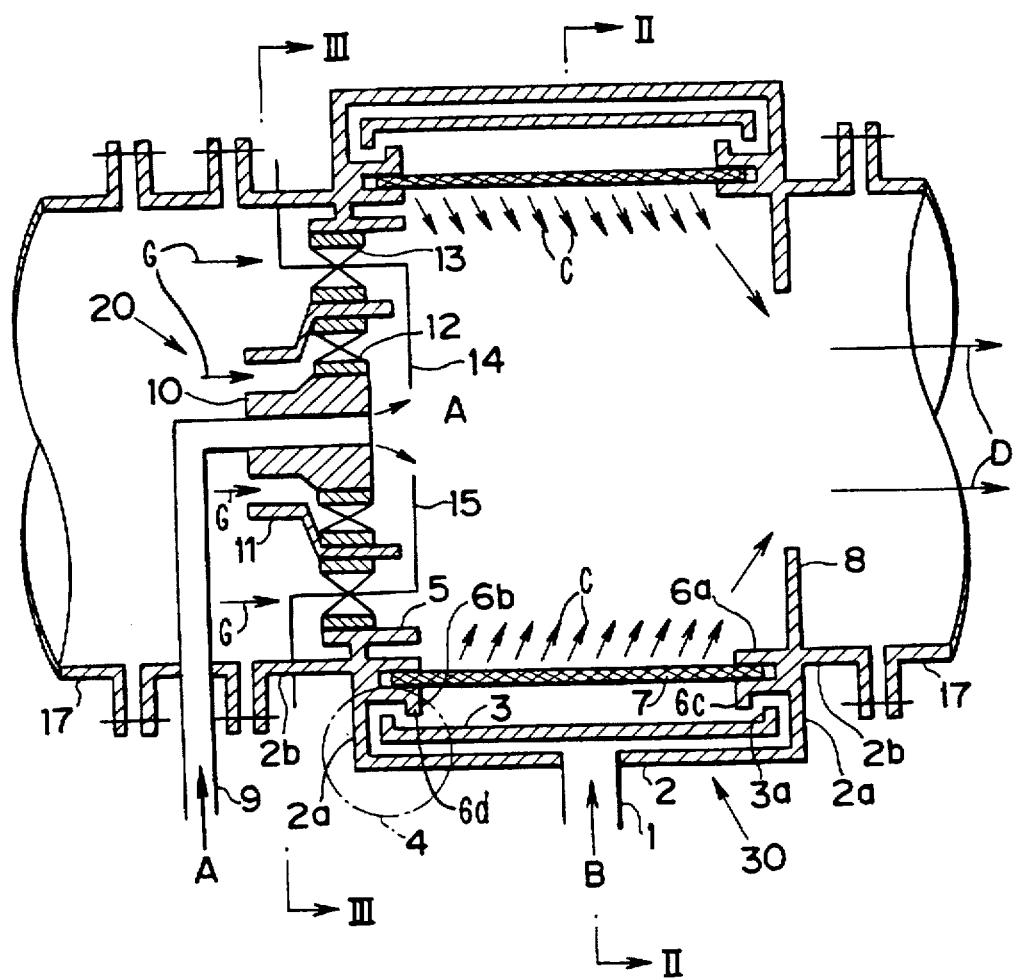
FIG. 1 is a sectional view of one embodiment of a gas heating apparatus according to the present invention.

FIG. 1 is a sectional view of one embodiment of a gas heating apparatus according to the present invention. The apparatus for heating a gas, such as air or the like, of the present invention comprises a cylindrical outer shell 2 which is disposed along a duct 17 in which a gas to be heated, such as air or the like, flows in direction shown by arrows D. A pre-mixture gas supply tube 1 is connected to the cylindrical outer shell 2. Combustion means generally denoted by 30, and which comprises a cylindrical sintered fiber mat 7, is arranged inside the outer shell 2 with a spacing being provided between the sintered fiber mat 7 and the outer shell 2. A diffusion type gas burner generally denoted by 20, is disposed upstream of the combustion means 30. The cylindrical sintered fiber mat 7 is formed of, for example, stainless steel fiber. The stainless steel meets JIS (Japanese Industrial Standard) SUS316 which is shown in JIS 4305, 1991.

The sintered fiber mat 7 is clamped and secured at both opposite ends thereof by mounting members 6a and 6b extending from (or attached to) protrusions 2a formed at both opposite ends of the outer shell 2. The sintered fiber mat 7 is surrounded by a flow passage forming cylinder 3 which is further surrounded by the outer shell 2.

In this construction of the apparatus, inner ends 6c, 6d of the outer mounting members 6a, 6b are bent outward in a radial direction, while outer ends 3a of the flow passage forming cylinder 3 are bent inward in the radial direction. With this arrangement, a pre-mixture gas B is supplied to the combustion means 30 from the pre-mixture gas supply tube 1 connected to the outer shell 2. During this gas supply, the pre-mixture gas B flows in a space formed between the outer shell 2 and the flow passage forming cylinder 3 so as to cool the mounting members 6a, 6b while changing its flow directions at the space formed between the inwardly bent portions at the outer ends 3a of the flow passage forming cylinder 3 and the outwardly bent portions 6c, 6d at the outer ends of the mounting members 6a, 6b. In the manner described above, a cooling area 4 is thus formed to cool each of the mounting members 6a, 6b of the sintered fiber mat 7.

Figure 2:
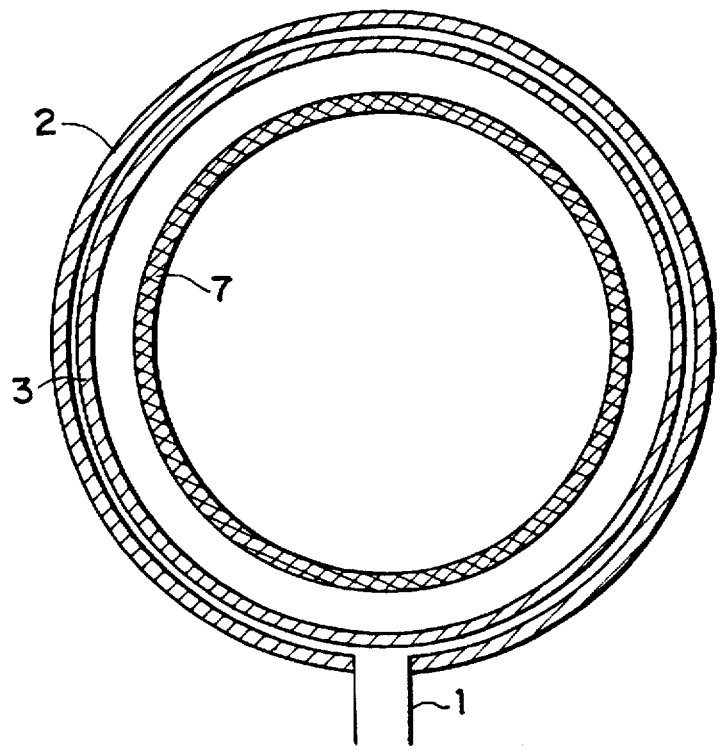
FIG. 2 is a sectional view taken along line II—II of FIG. 1.
Figure 3:
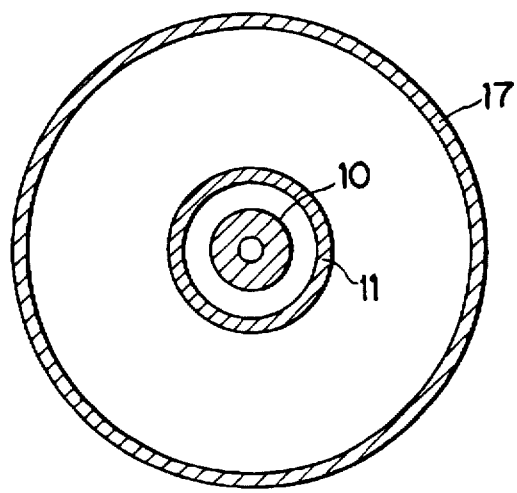
FIG. 3 is a sectional view taken along line III—III of FIG. 1.

A cross-section of the outer shell 2 (see FIG. 2) can be round (as shown in FIG. 2) or it can be in the shape of a square, hexagon, ellipse, or the like. The cross-sections of the flow passage forming cylinder 3 and the cylindrical members may also be round (as shown in FIG. 2) or they may be in the shape of a square, hexagon, ellipse, or the like. Thus, in this specification, the term "cylinder" or "cylindrical" is used to mean in all cases that a cross-section shape may be round, square, hexagonal, ellipsoid, or any other suitable hollow shape.

The diffusion burner 20 is used as an auxiliary burner to reinforce the combustion means 30, and the output of the diffusion burner 20 is made smaller than that of the combustion means 30.

Figure 4:
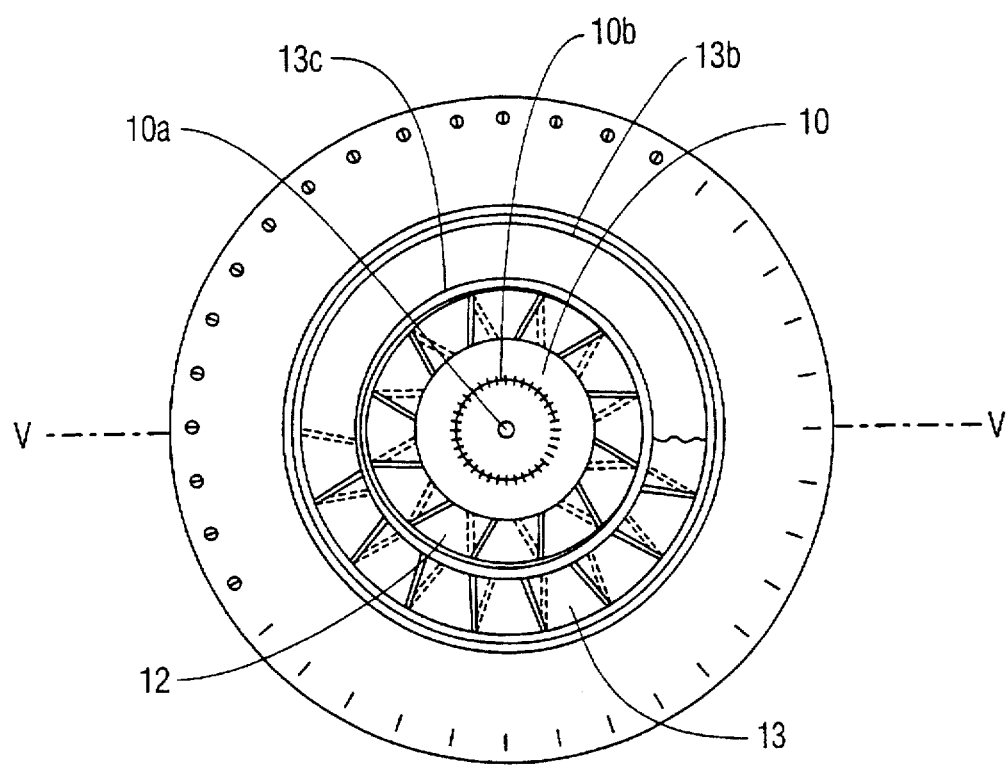
FIG. 4 is a plan view of a diffusion burner of the present invention.
Figure 5:
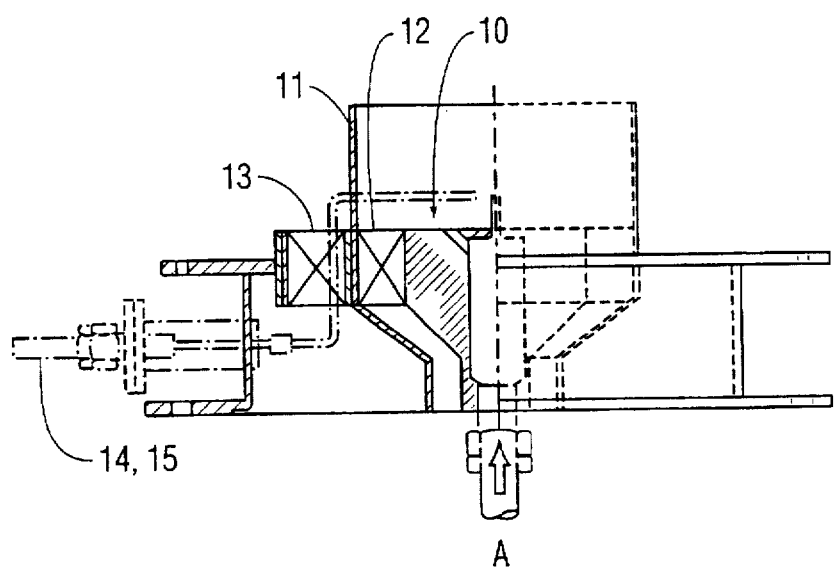
FIG. 5 is a side sectional view taken along V—V line of FIG. 4.
Figure 6A:
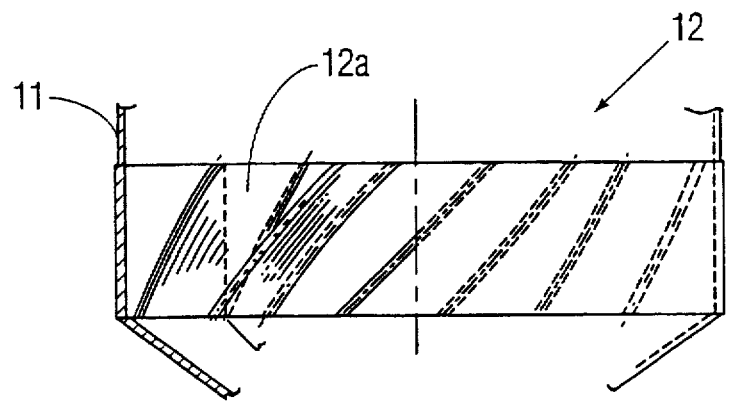
FIG. 6A is a side sectional view of an inner swirling blade.
Figure 6B:
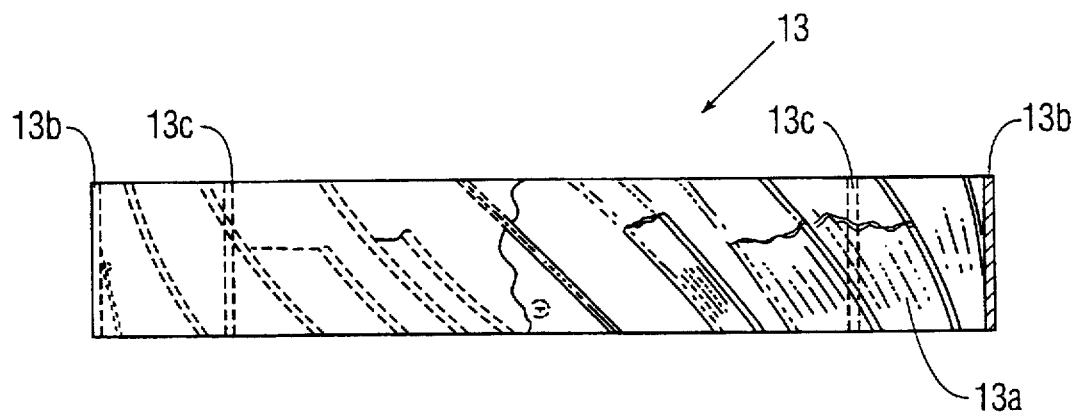
FIG. 6B is a side sectional view of an outer swirling blade.
Figure 7:
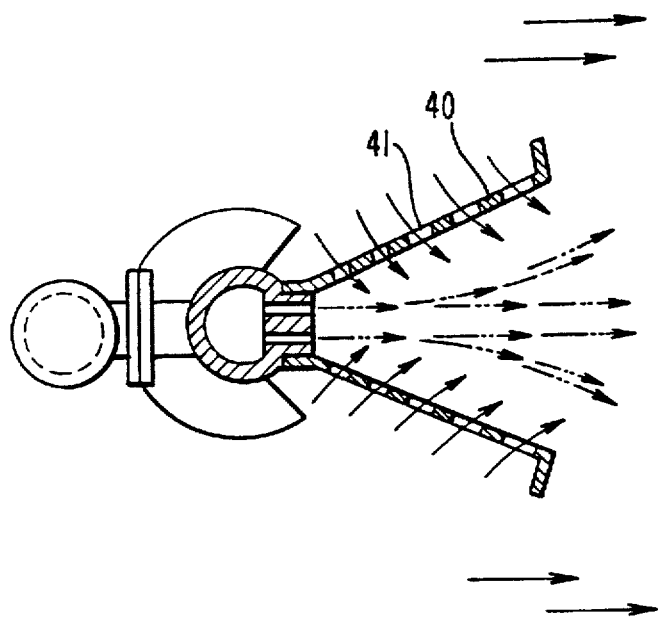
FIG. 7 illustrates a prior art heating apparatus.

As shown in FIGS. 1, 3, 4 and 5, the diffusion burner 20 comprises a burner tip 10 and a sleeve-like forward projecting member or snout 11 surrounding the burner tip 10. An inner swirling vane 12 arrangement (see also FIG. 6A) is arranged in a ring-like shape between the snout 11 and the burner tip 10. The inner swirling vane 12 comprises a plurality of vane elements 12a as shown in FIG. 6A. Each vane element 12a is inclined and stationarily mounted between the snout 11 and the burner tip 10. Similarly, another outer swirling vane 13 arrangement (see FIG. 6B) is disposed in a ring-like shape outside (i.e., around) the snout 11. The outer swirling vane 13 arrangement comprises a plurality of vane elements 13a as shown in FIG. 6B. The outer swirling vane arrangement also includes an outer cylindrical frame 13c and an inner cylindrical frame 13b, as shown in FIG. 4 and FIG. 6B. Each vane element 13a is inclined and is stationarily mounted between the inner cylindrical frame 13b and the outer cylindrical frame 13c.

Burner tip 10 has fuel gas nozzle 10a (see FIG. 4) for jetting out fuel gas A at the center of the burner tip 10, and a fuel gas nozzle 10b (FIG. 4) for jetting out fuel gas A concentrically.

A fuel gas A is supplied to the diffusion burner 20 through a fuel gas supply tube 9 which is connected to an upstream end of the burner tip 10 in the flow of a gas to be heated. The flow of a gas to be heated is shown by arrows G in FIG. 1.

An ignition device 14 and a flame detector 15 (see FIG. 5) of the diffusion burner 20 are located in such a manner that they can come into contact with a flame produced by the fuel gas A ejected from the burner tip 10. Ignition device 14 and flame detector 15 shown in FIG. 1 are integratedly connected as shown in FIG. 5.

A blow-screening member 5 formed in a ring-like shape is disposed inside a cylindrical member 2b of the outer shell 2 located adjacent to an upstream end of the gas heating apparatus. In other words, in the flow of the gas to be heated, the blow-screening member 5 is mounted around the outer swirling blade 13 in such a way that it extends axially toward the upstream end of the sintered fiber mat 7 in the form of a protrusion directed inwardly of the gas flow passage. The sintered fiber mat 7 is arranged downstream of the blow-screening member 5.

A flow reducing member 8 is disposed inside the cylindrical member 2b of the outer shell 2 which is located adjacent to a downstream end of the apparatus. With this arrangement, the cross-sectional area of the gas to be heated passing through the flow reducing member 8 is decreased.

The burning and heating operation of the illustrated embodiment of the gas heating apparatus described above will now be explained.

The pre-mixture gas B supplied from the pre-mixture gas supply tube 1 passes in an annular space between the outer shell 2 and the flow passage forming cylinder 3 so as to be supplied to the cooling parts 4 formed of respective mounting members 6a, 6b attached to both ends of the sintered fiber mat 7. The mounting members 6a, 6b support the respective ends of the cylindrical sintered fiber mat 7. In the cooling part 4, the pre-mixture gas B cools the mounting members 6a, 6b and, at the same time, the pre-mixture gas B is pre-heated.

The thus-preheated pre-mixture gas B flows in the annular space between the flow passage forming cylinder 3 and the sintered fiber mat 7 and passes through the pores of the sintered fiber mat 7 at a static pressure so as to reach an inner side of the cylindrical sintered fiber mat 7, which inner side of the sintered fiber mat 7 forms the combustion surface. At this time, the pre-mixture gas B burns on the inner combustion surface of the sintered fiber mat 7 and, upon completion of burning, the pre-mixture gas B is thus transformed into a high-temperature combustion gas and is discharged into the flow path of the gas to be heated. See arrows C in FIG. 1.

Since it is possible to burn the pre-mixture gas on the inner facing surface of the sintered fiber mat 7 with high density, a higher heat output can be produced from the sintered fiber mat burner 7 of the combustion means 30.

In the sintered fiber mat burner 7, formed of SUS316 metal of this embodiment, a per load unit applied to the sintered fiber mat 7 reaches a maximum of 100 kcal/cm$^2$H. When the combustion area of the sintered fiber mat is 1800 cm$^2$ (for a cylindrical sintered fiber mat having a diameter of 25 cm and an axial length of 23 cm), it is possible to obtain a high output, i.e., 180.000 kcal/H (approximately 210 kw).

On the other hand, the minimum load on the surface of the sintered fiber mat is 15 kcal/cm$^2$H or lowers and the minimum output is thus approximately 31 kw, resulting in a turn-down ratio (i.e. minimum output to maximum output) of approximately 1:7.

The heat emitted by burning at the combustion means 30 is supplied to the flow of the gas to be heated from the inner surface of the cylindrical red-heated sintered fiber mat 7 by virtue of convection heat transfer and the diffusion of the high-temperature combustion gas. See arrows C in FIG. 1.

The high temperature combustion gas is introduced in the downstream direction of the center axis of the piping through the flow reducing member 8 and is promoted to be mixed with the gas to be heated.

The heating of the gas is thus completed, and then the heated gas flows out from the heating apparatus into a process unit placed downstream of the heating apparatus. See arrows D in FIG. 1.

The fuel gas A supplied from the fuel gas supply tube 9 is ejected from the forward end of the burner tip 10 of the diffusion burner 10. The gas to be heated partially passes between the snout or ring-shaped member 11 and the outer side of burner tip 10 and is transformed into a swirling flow around an axis of the diffusion burner by the swirling vane or blade member 12 (see FIG. 6A). The swirling flow of the gas (caused by swirling vane or blade member 12) is thus further mixed with the fuel gas, and a flame is ejected from the forward end of the burner tip 10. The gas mixture then burns so as to form a diffusion flame.

During the formation of the diffusion flame, it is unlikely that the flame will be misfired by the high-speed gas to be heated which has been transformed into the swirling flow caused by the swirling blade 12 and by virtue of the snout 11.

The diffusion burner 20 of the above-described embodiment produces an output at a maximum of about 35 kw and at a minimum of about 3 kw. With a combination of the diffusion burner 20 and the combustion means 30 (the sintered fiber mat burner 7), the total output reaches a maximum of about 245 kw and a minimum of about 3 kw, resulting in a high turn-down ratio (minimum output to maximum output) of about 1:80 or more. That is to say, when the turn-down ratio is expressed by a fraction, the denominator is 80 or more.

The diffusion flame from diffusion burner 20 is ignited by the ignition device 14, and ignition and misfire are detected by the flame detector 15. In this embodiment, the diffusion burner 20 operates as a pilot burner for the flame of the sintered fiber mat 7 and also serves the functions of igniting the sintered fiber mat 7 and stabilizing the flame. See FIG. 5 which shows the ignition device 14 and the flame detector 15 integratedly connected.

The gas to be heated flowing around the outside of the ring-shaped snout 11 is transformed into a swirling flow around the axis of the diffusion burner by the swirling blade 13 (see FIG. 6B) so as to be introduced in a swirling flow into the area of the sintered fiber mat burner 7. This swirling flow accelerates the mixture of the combustion gas discharged from the sintered fiber mat 7 and the gas to be heated, and also promotes the convection heat transfer on the internal or inner-facing surface of the sintered fiber mat 7.

The ring-shaped blow-screening member 5 decreases the flow velocity of the gas to be heated at the upstream portion of the heating apparatus so as to serve the function of stabilizing the flame of the sintered fiber mat burner 7.

The operation and construction of the gas heating apparatus according to the present invention will further be described below.

1. The combustion means 30 comprises the sintered fiber mat burner 7 which is formed in a cylindrical (i.e., round, square, hexagonal, ellipsoid, etc.) shape to match the shape of the piping or that of the duct 17 and has a combustion surface on its inside. With this construction, the following operations or techniques can be realized:

a) A pre-mixture gas of a combustion gas and air is ejected from the sintered fiber mat 7 having a high ratio of pores which has been obtained by sintering ceramic fiber, metal fiber or the like in the form of a layer. The sintered fiber mat burner thus formed enables the completion of the combustion with a higher output in the vicinity of the inner surface of the cylindrical sintered fiber mat. The length of the flame generated by such a sintered fiber mat burner 7 is much shorter than that obtained with other types of burners for performing pre-mixing or diffusion combustion, whereby it is hardly developed into a proper flame.

b) The energy of the charged fuel gas is used for heating the gas by mixing the combustion gas and a gas to be heated, and also for heating the gas by virtue of the convection heat transfer on the combustion surface of the sintered fiber mat burner.

c) Since the pre-mixture gas is burned, it is not necessary to provide a space for mixing a fuel gas and oxygen in the vicinity of the sintered fiber mat burner.

d) The combustion surface is constructed in the form of the sintered fiber mat, which can be easily formed into various shapes, which further enables changing the shape of the sintered fiber burner itself and/or the outer shell 2 and/or cylinder 3.

e) A space required for heating a gas is small and is also integrally formed in a cylindrical shape to match the shape of the piping or the duct, thus enabling the downsizing of the sintered fiber mat burner while still producing a high maximum heat output.

2. A blow-screening member 5 is disposed inside the cylindrical member of the outer shell located adjacent to an upstream end of the heating apparatus, from which a gas to be heated flows to the combustion means 30, so as to prevent the flow of the gas from directly striking the combustion surface of the sintered fiber mat 7 of the combustion means 30.

A rise in the flow rate or the temperature of the gas to be heated increases the flow velocity of the gas passing through the gas heating apparatus. If this should happen, the flame of the sintered fiber mat burner 7 may be blown off, thus causing a misfire.

If the blow-screening member 5 is not provided, the gas to be heated flows at a reduced velocity along the inner surface, i.e., the combustion surface, of the sintered fiber mat 7 of the combustion means 30 which is formed in a cylindrical shape to match the shape of the piping or the duct. With this arrangement, it is less likely that a misfire occurs in the flow of the gas to be heated downstream, by virtue of the flame-stabilizing effect exerted upstream in the flow of the gas. However, once the flame is separated in the farthest upstream portion of the flow of the gas, the separation spreads farther downstream, possibly causing a misfire in the entire flow of the gas.

In order to overcome the above-described drawbacks, the above-described blow-screening member 5 is provided. The blow-screening member 5 is disposed in the flow path of the gas to be heated in the upstream portion of the apparatus so that the flow velocity of the gas near the upstream portion of the sintered fiber mat burner surface is decreased, in which case the separation of the flame can be prevented.

Even when the flame of the sintered fiber mat burner 7 is exposed to a high velocity gas to be heated at the downstream portion thereof, by preventing the flame separation of the upstream portion of the gas to be heated, the occurrence of a misfire can be prevented in the entire burner because of the flame stabilization at the upstream portion thereof.

3. An air flow reducing member 8 is disposed inside the cylindrical member 2b of the outer shell adjacent to the downstream end of the apparatus, from which the gas to be heated is discharged through the combustion means 30. With this construction, the cross-sectional area of the gas passing through the air flow reducing member 8 is partially decreased.

In the combustion means 30 which comprises the sintered fiber mat 7 formed in a cylindrical shape to match the shape of the piping or the duct, the combustion gas blows in the direction generally perpendicular to the surface of the sintered fiber mat 7 toward the center axis of the piping or the duct 17, but disadvantageously changes its direction and flows along the wall surface of the piping or the duct 17 from the surface of the sintered fiber mat 7 because of the flow of the gas to be heated, whereby the combustion gas is not well mixed with the gas to be heated in the gas heating apparatus.

If a good mixture of the combustion gas and the gas to be heated in the gas heating apparatus is not performed, the gas having a higher temperature disadvantageously flows along the wall surface of the piping or the duct 17 from the surface of the sintered fiber mat 7. Because of this disadvantage, the temperature will not become uniform until the combustion gas and the gas to be heated are finally mixed at the piping or the duct 17 downstream by a turbulent flow.

In order to supply a gas having a uniform temperature to a process unit, such as a heat exchanger, located downstream of the gas heating apparatus, it is usually necessary in the prior art to lengthen the piping or the duct, by taking into consideration the mixture of gases. Also, in the prior art, since the piping or the duct located downstream is exposed to the high-temperature combustion gas which has not been properly mixed with the gas to be heated, the temperature of the piping or the duct 17 at the downstream portion becomes higher than necessary.

In order to solve the above-described problem, the flow reducing member 8 is disposed in the gas heating apparatus downstream of the combustion means 30 so as to accelerate the mixture of the gas to be heated and the combustion gas. This further enables the shortening of the length of the piping or the duct 17 downstream or eliminates the necessity of lengthening the piping or the duct 17 downstream, as would be otherwise required for the mixture of the gases. Additionally, by providing the flow reducing member 8, the gases are mixed so as to average the temperature of the gas to be heated and also to decrease the temperature of the piping or that of the duct 17 located downstream of the heating apparatus.

4. A flow passage through which a pre-mixture gas is supplied is arranged along the outer peripheral surface of the mounting members 6a, 6b which are arranged at both ends of the sintered fiber mat 7.

The mounting members 6a, 6b securing the combustion means 30, i.e., the sintered fiber mat 7, are adjacent to the combustion surface of the sintered fiber mat 7 so that they are easily raised to a higher temperature, which heat is transferred to the non-combustion surface (outer facing surface) of the sintered fiber mat 7, thereby increasing the temperature thereof.

When the mounting members 6a, 6b and the non-combustion (outer) surface of the sintered fiber mat 7 rise to a higher temperature to such an extent as to exceed the ignition temperature of a fuel gas, they come into contact with the fuel gas, which is thus ignited, whereby a back fire may occur in the portions thereof adjacent to the fuel gas supply tube. In order to avoid this disadvantage, it is necessary to cool the mounting members 6a, 6b.

For performing this cooling operation, a cooling method in which air and water are introduced from the exterior is known, in which case, however, it is necessary to externally supply air and water from outside sources. In addition, air and water which have been used for cooling must then be discharged to the exterior of the system, thus causing a loss of energy.

In order to solve the above-described problems, a flow passage, through which the pre-mixture gas is supplied, is disposed along the outer peripheral surface of the mounting members 6a, 6b so that the mounting members 6a, 6b are cooled by the flow of the pre-mixture gas being fed into the system.

This arrangement eliminates the necessity of providing outside sources of air and water specifically used for the cooling operation. Also, with this construction, the supplied fuel gas is preheated by heat exchange during cooling of the mounting members 6a, 6b. Further, it can be avoided that heat energy will be discharged to the exterior of the system because of the cooling, thus saving the loss of energy.

5. The diffusion burner 20 is disposed inside the apparatus and upstream of the combustion means 30. In a combustion means 30 formed of a ceramic fiber mat 7, the ratio of the minimum output to the maximum output, i.e., the turn-down ratio, is about 1:2. In contrast, in a combustion means 30 formed of a metal fiber mat, the turn-down ratio is about 1:7. When a gas to be heated contains a sufficient amount of oxygen as air does, using the combination of the above-described sintered fiber mat burner 30 with a diffusion burner 20 having a turn-down ratio of about 1:12 or more, that is, in the case of the turn-down ratio expressed by a fraction, the number in the denominator is 12 or more. With the diffusion burner 20 producing a lower heat output than the sintered fiber mat burner 30, it is possible to attain a high turn-down ratio, a total of from about 1:20 to about 1:80, which cannot be obtained by use of only a sintered fiber mat burner without the diffusion burner 20.

As seen from the above, the turn-down ratio of the sintered fiber mat burner ranges from about 1:2 to about 1:7. The turn-down ratio of the diffusion burner is about 1:10. Suppose that the sintered fiber mat burner turn-down ratio is about 1:7 (from a minimum output of about 30 kw to a maximum output of about 210 kw) and the diffusion burner turn-down ratio is about 1:10 (from a minimum output of about 3 kw to a maximum output of about 30 kw), then the total sum of the two turn-down ratios amounting to about 1:80 (from a minimum output of about 3 kw to a maximum output of about 240 kw) is attained. If the sintered fiber mat burner turn-down ratio is about 1:2 (from a minimum output of about 30 kw to a maximum output of about 60 kw), the total turn-down ratio amounts to about 1:21 (from a minimum output of about 3 kw to a maximum output of about 63 kw).

To provide a sintered fiber mat burner with a turn-down ratio of about 1:7, the material of the fiber is metal such as stainless steel, for example, JIS SUS 316. To provide a turn-down ratio of about 1:2, the fiber material is a ceramic. When a metal fiber is used, the turn-down ratio is higher than that obtained in case of ceramic fiber being used. However, for example, even if a sintered fiber mat with a turn-down ratio of about 1:2 is used, the combination of the sintered fiber mat with the diffusion burner produces a turn-down ratio of about 1:20. Such a turn-down ratio of about 1:2 cannot be attained by using only a sintered fiber mat. This further contributes to the effect of enabling the apparatus to be made compact in size.

As described above, even if a ceramic fiber is used as a material of the sintered fiber mat, a high turn-down ratio of about 1:20 is achieved (which cannot be obtained without the combination with the diffusion burner). Therefore, the material for the sintered mat may be metal fiber or ceramic fiber.

Materials for the sintered fiber mat are (i) metal fibers such as stainless steel fibers, or inconel fibers, or hastelloy fibers, or and titanium fibers and (ii) ceramic fibers such as $Al_2O_3$ or $SiO_2$. The metal fibers range from about 10 to about 50 μm in diameter and from about 2 to about 30 mm in length. The ceramic fibers range from about 5 to about 15 mm in diameter and preferably have a substantially continuous (very long) length. That is, the lengths of the ceramic fibers are long so that they can effectively be considered "continuous". The porosity of the sintered metal fiber mat ranges preferably from about 80 to about 95% and the porosity of the sintered ceramic fiber mat ranges from about 50 to about 90%. The sintered metal fiber mat preferably ranges from about 2 to about 5 mm in thickness. The sintered ceramic fiber mat preferably ranges from about 1 to about 3 mm in thickness.

As will be clearly understood from the foregoing description, the present invention offers the following advantages. The gas heating apparatus is constructed in such a manner that the combustion means 30 comprises a sintered fiber mat 7 which is formed in a cylindrical shape to match the shape of the piping or the duct and has a combustion surface on its inner surface. With this construction, the gas heating apparatus can produce a higher output and can also be downsized.

What is claimed is:

1. A gas-heating apparatus comprising:
   a cylindrical outer shell coupled in a path of a piping or a duct in which a gas to be heated is supplied, said cylindrical outer shell having opposite ends in an axial direction of said outer shell;
   a pre-mixture gas supply tube connected to said outer shell for supplying a pre-mixture gas to an interior of said outer shell; and
   a combustion device including a cylindrical sintered fiber mat disposed inside said outer shell across a spacing and integrally formed in a cylindrical shape to correspond to the shape of the piping or the duct, said sintered fiber mat having opposite ends which are secured to protrusions located at respective opposite ends of said outer shell, an inner surface of said sintered fiber mat, facing the interior of said outer shell, the combustion device further including a combustion surface for combusting said supplied pre-mixture gas.

2. The gas heating apparatus of claim 1, further comprising a blow-screening member for preventing the flow of said gas to be heated from directly striking said combustion surface, said blow-screening member being disposed inside a cylindrical member of said outer shell adjacent to an upstream end of said outer shell from which said gas to be heated flows.

3. The gas heating apparatus of claim 2, further comprising a reducing member for decreasing a cross-sectional area of said gas passing through said reducing member, said reducing member being disposed inside the cylindrical member of said outer shell adjacent to a downstream end of said outer shell from which said gas to be heated flows out to an exterior region after being heated.

4. The gas heating apparatus of claim 3, further comprising a flow passage forming cylinder disposed between said sintered fiber mat and said outer shell, a flow passage for said pre-mixture gas being formed between said outer shell and said flow passage forming cylinder and between said flow passage forming cylinder and said sintered fiber mat.

5. The gas heating apparatus of claim 4, further comprising a diffusion burner provided upstream of said combustion means for heating said gas to be heated.

6. The gas heating apparatus of claim 5, wherein the diffusion burner produces a lower heat output than said combustion means.

7. The gas heating apparatus of claim 1, further comprising a diffusion burner provided upstream of said combustion means for heating said gas to be heated.

8. The gas heating apparatus of claim 7, wherein the diffusion burner produces a lower heat output than said combustion means.

9. The gas heating apparatus of claim 2, further comprising a diffusion burner provided upstream of said combustion means for heating said gas to be heated.

10. The gas heating apparatus of claim 9, wherein the diffusion burner produces a lower heat output than said combustion means.

11. The gas heating apparatus of claim 3, further comprising a diffusion burner provided upstream of said combustion means for heating said gas to be heated.

12. The gas heating apparatus of claim 11, wherein the diffusion burner produces a lower heat output than said combustion means.

* * * * *

UNITED STATES PATENT AND TRADEMARK OFFICE
CERTIFICATE OF CORRECTION

PATENT NO. : 5,749,720
DATED : May 12, 1998
INVENTOR(S) : Fukuda et al.

Page 1 of 1

It is certified that error appears in the above-identified patent and that said Letters Patent is hereby corrected as shown below:

Column 4,
Line 32, change "lowers" to -- lower --;

Signed and Sealed this

Fifth Day of February, 2002

Attest:

JAMES E. ROGAN
Attesting Officer   Director of the United States Patent and Trademark Office

UNITED STATES PATENT AND TRADEMARK OFFICE
CERTIFICATE OF CORRECTION

PATENT NO.   : 5,749,720
DATED         : May 12, 1998
INVENTOR(S)  : Fukuda et al.

It is certified that error appears in the above-identified patent and that said Letters Patent is hereby corrected as shown below:

<u>Column 4,</u>
Line 32, change "lowers" to -- lower --;

<u>Column 9,</u>
Line 5, after "apparatus" insert -- for attachment to a duct having a duct wall --;
Line 6, after "a cylindrical" delete "outer shell coupled in a path of a piping or";
Lines 7-9, delete lines 7-9 and insert -- shell having opposite axial open ends for coupling to said duct, the axial open ends being parallel to a flow of fluid passing through the duct when the axial open ends are in fluid communication with the duct, the cylindrical shell including: a cylindrical member; protrusions extending radially outwardly from said cylindrical member, said protrusions defining an opening in said duct parallel to the axis of the duct, said protrusions including mounting members;
   a wall spaced outward from said cylindrical member and intersecting said protrusions to form a well radially outwardly from said duct; --
Line 10, change "outer" to -- cylindrical --;
Line 11, delete "an interior of";
Line 12, change "outer shell" to -- well --;
Line 14, change "inside said outer shell" to -- within said well --, and change "a spacing" to -- the opening in said duct --;
Line 16, after "shape" insert -- and size --; and delete "piping or the";
Line 18, delete the line and replace with -- each secured to said mounting members, a first --;
Line 19, delete "ends of said outer shell, an inner"
Line 20, after "mat" delete ",", change "the interior of said outer shell, the," to -- said wall, a second --;
Line 21, delete "combustion device further including a";
Line 22, after "face" insert -- of said sintered fiber mat facing an interior region of said duct --;
Line 27, change "outer" to -- cylindrical --;
Line 28, change "outer" to -- cylindrical --;
Line 34, change "outer" to -- cylindrical --;

UNITED STATES PATENT AND TRADEMARK OFFICE
CERTIFICATE OF CORRECTION

PATENT NO. : 5,749,720
DATED : May 12, 1998
INVENTOR(S) : Fukuda et al.

It is certified that error appears in the above-identified patent and that said Letters Patent is hereby corrected as shown below:

Column 10,
Line 1, change "outer" to -- cylindrical --;
Line 6, change "outer" to -- cylindrical --;
Line 9, change "claim 4" to -- claim 1 --;
Line 11, change "means" to -- device --;
Line 14, change "means" to -- device --;
Line 15, change "claim 1" to -- claim 2 --;
Line 17, change "means" to -- device --;
Line 20, change "means" to -- device --;
Line 21, change "claim 2" to -- claim 3 --;
Line 23, change "means" to -- device --;
Line 26, change "means" to -- device --;
Line 27, change "claim 3" to -- claim 4 --;
Line 29, change "means" to -- device --;
Line 32, change "means" to -- device --;

Signed and Sealed this

Seventeenth Day of September, 2002

*Attest:*

*Attesting Officer*

JAMES E. ROGAN
*Director of the United States Patent and Trademark Office*